US009985295B2

United States Patent
Korevaar et al.

(10) Patent No.: US 9,985,295 B2
(45) Date of Patent: May 29, 2018

(54) SOLID OXIDE FUEL CELL STRUCTURES, AND RELATED COMPOSITIONS AND PROCESSES

(75) Inventors: Bastiaan Arie Korevaar, Schnectady, NY (US); Yuk-Chiu Lau, Ballston Lake, NY (US); Anteneh Kebbede, Albany, NY (US); Harish Radhakrishna Acharya, Clifton Park, NY (US); Badri Narayan Ramamurthi, Clifton Park, NY (US); Gregory John Parker, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 2873 days.

(21) Appl. No.: 11/235,555

(22) Filed: Sep. 26, 2005

(65) Prior Publication Data

US 2007/0072035 A1    Mar. 29, 2007

(51) Int. Cl.
| | |
|---|---|
| *H01M 8/12* | (2016.01) |
| *H01M 8/24* | (2016.01) |
| *H01M 4/86* | (2006.01) |
| *H01M 4/90* | (2006.01) |
| *H01M 4/88* | (2006.01) |

(Continued)

(52) U.S. Cl.
CPC ....... *H01M 4/9025* (2013.01); *H01M 4/8621* (2013.01); *H01M 4/8885* (2013.01); *H01M 4/9066* (2013.01); *H01M 8/1226* (2013.01); *H01M 8/1246* (2013.01); *H01M 4/9016* (2013.01); *Y02E 60/525* (2013.01); *Y02P 70/56* (2015.11)

(58) Field of Classification Search
CPC .................................................. H01M 8/1213
USPC .............................. 429/96, 12, 40
See application file for complete search history.

(56) References Cited

U.S. PATENT DOCUMENTS

| | | |
|---|---|---|
| 4,741,286 A | 5/1988 | Itoh et al. |
| 5,047,612 A | 9/1991 | Savkar et al. |
| (Continued) | | |

FOREIGN PATENT DOCUMENTS

| | | |
|---|---|---|
| WO | 02078111 A2 | 10/2002 |
| WO | 02101859 A2 | 12/2002 |
| (Continued) | | |

OTHER PUBLICATIONS

Aruna et al., "Synthesis and properties of Ni-YSZ cermet: anode material for solid oxide fuel cells," Solid State Ionics, vol. 111, Issues 1-2, Aug. 1, 1998, pp. 45-51.*

(Continued)

*Primary Examiner* — Ula C Ruddock
*Assistant Examiner* — Amanda Barrow
(74) *Attorney, Agent, or Firm* — John P. Darling

(57) ABSTRACT

A solid oxide fuel cell is disclosed. The fuel cell includes a porous anode, formed of finely-dispersed nickel/stabilized-zirconia powder particles. The particles have an average diameter of less than about 300 nanometers. They are also characterized by a tri-phase length of greater than about 50 µm/µm³. A solid oxide fuel cell stack is also described, along with a method of forming an anode for a solid oxide fuel cell. The method includes the step of using a spray-agglomerated, nickel oxide/stabilized-zirconia powder to form the anode.

13 Claims, 4 Drawing Sheets

(51) Int. Cl.
*H01M 8/1226* (2016.01)
*H01M 8/1246* (2016.01)

(56) References Cited

U.S. PATENT DOCUMENTS

| | | | |
|---|---|---|---|
| 5,061,682 A | | 10/1991 | Aksay et al. |
| 5,141,825 A | * | 8/1992 | Jensen .................. 429/535 |
| 5,332,598 A | | 7/1994 | Kawasaki et al. |
| 5,508,097 A | | 4/1996 | Hauser et al. |
| 5,527,591 A | | 6/1996 | Crotzer et al. |
| 5,869,432 A | | 2/1999 | Aksay et al. |
| 6,022,594 A | | 2/2000 | Borom et al. |
| 6,051,329 A | * | 4/2000 | Fasano et al. ............ 429/486 |
| 6,256,095 B1 | | 7/2001 | Ringlien |
| 6,274,201 B1 | | 8/2001 | Borom et al. |
| 6,420,063 B1 | | 7/2002 | Ozin et al. |
| 6,420,064 B1 | * | 7/2002 | Ghosh et al. ............ 429/489 |
| 6,492,053 B1 | | 12/2002 | Donelson et al. |
| 6,703,334 B2 | | 3/2004 | Belov et al. |
| 6,794,075 B2 | | 9/2004 | Steele et al. |
| 2001/0012576 A1 | * | 8/2001 | Christiansen ............. 429/33 |
| 2002/0048699 A1 | | 4/2002 | Steele et al. |
| 2003/0134170 A1 | | 7/2003 | Sarkar et al. |
| 2003/0180602 A1 | | 9/2003 | Finn et al. |
| 2003/0224238 A1 | | 12/2003 | Finn et al. |
| 2004/0018409 A1 | * | 1/2004 | Hui ................. H01M 4/8621 429/489 |
| 2004/0076868 A1 | * | 4/2004 | Mardilovich ....... H01M 4/8621 429/456 |
| 2005/0048356 A1 | * | 3/2005 | Ihringer ............ H01M 8/1231 429/423 |
| 2005/0221131 A1 | * | 10/2005 | Roy et al. .................. 429/34 |
| 2006/0068261 A1 | * | 3/2006 | Bourgeois et al. ......... 429/34 |
| 2006/0083970 A1 | * | 4/2006 | Shibutani et al. .......... 429/30 |
| 2007/0020508 A1 | * | 1/2007 | Lee et al. .................. 429/45 |
| 2007/0054169 A1 | * | 3/2007 | Day et al. ................. 429/30 |

FOREIGN PATENT DOCUMENTS

| | | | | |
|---|---|---|---|---|
| WO | WO 03/058744 | * | 7/2003 | ........... H01M 8/12 |
| WO | WO 03/075388 | * | 9/2003 | ........... H01M 8/06 |

OTHER PUBLICATIONS

Fukui et al., "Morphology control of Ni-YSZ cermet anode for lower temperature operations of SOFCs," J. Power Sources, 125 (2004) 17-21, available Jan. 2, 2004.*

Stambouli et al., "Solid Oxide fuel cells (SOFCs): a review of an environmentally clean and efficient source of energy," Renewable and Sustainable Energy Reviews, 6 (2002) (month unknown).*

Fukui et al., "Long-Term Stability of Ni-YSZ Anode with New Microstructure Prepeared from Composite Powder," Electrochemical and Solid-State Letters, 1 (3) 120-122 (1998), available electronically Jul. 9, 1998.*

Hong et al., Microstructure and electrical conductivity of Ni/YSZ and NiO/YSZ composites for high-temperature electrolysis prepared by mechanical alloying, J. Power Sources, 149 (2005) 84-89, Available Online May 24, 2005.*

US 2005/0058883 A1, Ruka et al., "Plasma Sprayed Ceramic-Metal Fuel Electrode", Mar. 17, 2005.

Sanghin Lee et al., "Preparation of BaTiO3 Nanoparticles by Combustion Spray Pyrolysis", Materials Letters 58 (2004), pp. 2932-2936.

M. Lang et al., "Development and Characterization of Vacuum Plasma Sprayed Thin Film Solid Oxide Fuel Cells", Journal of Thermal spray Technology, vol. 10 (4), Dec. 2001, pp. 618-625.

M. Lang et al., "Electrochemical Characterisation of Vacuum Plasma Sprayed Sofcs on Different Porous Metallic Substrates", Electrochemical society Proceedings, vol. 2003-07, pp. 1059-1067.

Paola costamagna et al., "Micro-modelling of solid oxide fuel cell electrodes", Pergamon, PII: S0013-4686(97)00063-7, Electrochimica Acta, vol. 43, Nos. 3-4, pp. 375-394, 1998.

Anthony M. Thompson et al., "Electrochemical Cell Structures and Methods of Making the Same".

Shu Ching Quek et al., "Substrates for Deposited Electromechanical Cell Structures and Methods of Making the Same".

* cited by examiner

SOLID OXIDE FUEL CELL STRUCTURES, AND RELATED COMPOSITIONS AND PROCESSES

CROSS REFERENCE TO RELATED APPLICATIONS

This application is related to co-pending U.S. patent application Ser. No. 11/235,552, entitled "Substrates For Deposited Electrochemical Cell Structures And Methods Of Making The Same," and co-pending U.S. patent application Ser. No. 11/235,554, entitled "Electrochemical Cell Structures And Methods Of Making The Same," each filed contemporaneously herewith, which applications are hereby incorporated by reference.

BACKGROUND

This invention generally relates to electrochemical devices. More particularly, it relates to solid oxide fuel cells.

Many different types of fuel cells are known in the art, and described in many references. In general, a fuel cell is a device in which a fuel such as hydrogen or a hydrocarbon is electrochemically reacted with an oxidant such as air or oxygen, to produce a DC electrical output. The fuel cell includes a porous anode, or fuel electrode, which enhances the rate at which electrochemical reactions occur on the fuel side. There is also a porous cathode, or oxidant electrode, which functions similarly on the oxidant side. The anode is usually based on a mixture of a metal with a ceramic, such as nickel with stabilized zirconia. The cathode is usually based on one or more ceramic materials that are doped for high electrical conductivity, such as stabilized zirconia impregnated with strontium-doped lanthanum manganate ("lanthanum strontium manganate"). In a solid oxide fuel cell (SOFC), a solid electrolyte separates the anode from the cathode. The dense electrolyte is often formed from yttria-stabilized zirconia (YSZ).

In an SOFC, the fuel flowing through the anode reacts with oxygen ions to produce electrons and water. Other reaction products may also be present, e.g., carbon monoxide and/or carbon dioxide when the fuel includes various hydrocarbons. The water and other reaction products are removed in the fuel flow stream. The oxygen reacts with the electrons on the cathode surface to form oxygen ions that diffuse through the electrolyte to the anode. The electrons flow from the anode through an external circuit, and then to the cathode. The electrolyte is a ceramic material that is a non-conductor of electrons, ensuring that the electrons must flow through the external circuit to do useful work. However, the electrolyte permits the oxygen ions to pass through from the cathode to the anode.

SOFC devices are usually operated at temperatures between about 700°-1000° C. However, in order to increase the stability, efficiency, and service life of the devices, much effort is underway to reduce this temperature. Efforts are also being made to reduce the overall thickness of the SOFC—especially its electrolyte layer. A reduction in thickness can result in numerous advantages, such as decreased electrical resistance within the cell, and a decrease in cost.

The porosity of the anode and cathode (the active components of the cell) is very important to SOFC performance. Porosity controls the transport of gaseous fuel/oxidant to the reactive sites of the cell. Porosity also controls the length of the triple-phase boundary (TPB). The "TPB" can be defined as the interface at which the electronically/ionically conductive electrodes meet both the electrolyte and the gaseous fuel/oxidant. Charge transfer for the electrodes occurs at the TPB. Thus, a larger TPB, i.e., a greater number of triple phase boundary sites, can result in a greater power density—more electron flow out of the cell and into an external circuit.

In many conventional processes, the cathode-electrolyte-anode components of an SOFC are formed by positioning the individual layers on top of each other. For example, each individual layer can be tape-cast or screen-printed according to a desired sequence. A sacrificial, pore-forming material like graphite or an organic polymer is incorporated into the anode or cathode compositions. The powdery layers (in the "green" state) are then usually sintered in some sort of furnace. Sintering causes the powdery material (e.g., YSZ) to agglomerate. Moreover, at sintering temperatures, the sacrificial material is completely burnt out, resulting in a porous structure which is quite acceptable for some end uses.

While the conventional sintering processes mentioned above are suitable for preparing some types of SOFC devices, they also have some drawbacks. For example, larger-area fuel cells, e.g., those greater than about 10 inches×10 inches (25 cm×25 cm), may undergo significant warpage when sintered.

Furthermore, sintering of the active layers tends to form relatively large particles (grains) of each species. For example, sintering of materials like nickel and YSZ in the anode can result in particle sizes of greater than about 3 microns. There is strong evidence to suggest that this relatively large particle size is not ideal for many of the future-generation SOFC devices. Within a porous anode, the pattern of large particles does not result in the number of triple-phase boundary sites which are required for greater fuel cell efficiency and power, as discussed previously.

More recently, other processes have been employed to form anodes and other layers in SOFC's. For example, promising deposition techniques which do not appear to rely on sintering are described by M. Lang et al in "Development and Characterization of Vacuum Plasma Sprayed Thin Film Solid Oxide Fuel Cells" (Journal of Thermal Spray Technology, Vol. 10(4), 2001). Lang describes the use of vacuum plasma-sprayed layers to form the device. The use of these processes is said to result in thin devices with low internal resistance. The article describes cell-operating temperatures of 750° C.-800° C., with a power density of 300-400 $mW/cm^2$. Moreover, these types of deposition processes may minimize or eliminate some of the problems associated with sintering larger-size SOFC layers, such as warpage and cell-cracking.

While the concepts described by M. Lang et al may overcome some drawbacks of the prior art, the fuel cells described therein still appear to be deficient in some aspects. For example, the anode for the type of SOFC described by Lang appears to be too thick to be successfully incorporated into more advanced SOFC's. Moreover, the nickel-zirconia material described by Lang appears to be composed of particles which neither provide the optimum porosity, nor the optimum microstructure, for the anode layer. Thus, the SOFC's will probably fail to provide the power density required for next-generation devices.

With these challenges in mind, new developments for SOFC devices would be welcome in the art. SOFC's with improved active layer characteristics would be especially desirous, since they could lead to higher power density for the cells. Moreover, any reduction in the thickness of the SOFC would also be very useful. Furthermore, it would be very desirable if one or more of these improvements could be accomplished while still allowing the device to be made economically, and with acceptable high-temperature durability.

BRIEF DESCRIPTION OF THE INVENTION

One embodiment of this invention is directed to a solid oxide fuel cell. The fuel cell comprises:

(I) a porous anode, comprising finely-dispersed nickel/stabilized-zirconia powder particles, wherein the particles have an average diameter of less than about 300 nanometers; and wherein the particles are further characterized by a tri-phase length of greater than about 50 $\mu m/\mu m^3$;

(II) a porous cathode, spaced from the anode;

(III) an electrolyte, disposed between the anode and the cathode; and (IV) at least one interconnect structure, attached to at least one of elements (I) or (II), and capable of accommodating the flow of fuel and/or oxidant through the fuel cell.

Another embodiment relates to a solid oxide fuel cell stack. The stack comprises:

(a) a plurality of fuel cell units, each including an anode, a cathode, and an electrolyte which separates the anode and the cathode; and (b) at least one interconnect structure situated between each fuel cell unit; capable of accommodating the flow of fuel and/or oxidant through adjacent fuel cell units, and capable of completing an electrical circuit through the fuel cell stack; wherein the anode in each fuel cell unit comprises finely-dispersed nickel/stabilized-zirconia powder particles, as described herein.

Still another embodiment is directed to a method of forming an anode for a solid oxide fuel cell. The method comprises the step of applying a spray-agglomerated, nickel oxide/stabilized-zirconia powder over a substrate, by a thermal spray process.

A method for making a solid oxide fuel cell is also described. The method comprises the steps of:

(i) forming an anode on a surface of a porous support structure which comprises passages for the flow of fuel, by thermally-spraying a spray-agglomerated, nickel oxide/stabilized-zirconia powder over the surface;

(ii) forming an electrolyte layer over the anode by a thermal spray process;

(iii) forming a cathode over the electrolyte layer; and (iv) providing an interconnect structure over the cathode, wherein the interconnect structure is capable of accommodating the flow of oxidant, so as to complete an electrical circuit for the fuel cell.

Other features and advantages of the present invention will be more apparent from the following detailed description of the invention.

DETAILED DESCRIPTION OF THE INVENTION

Figure 1:
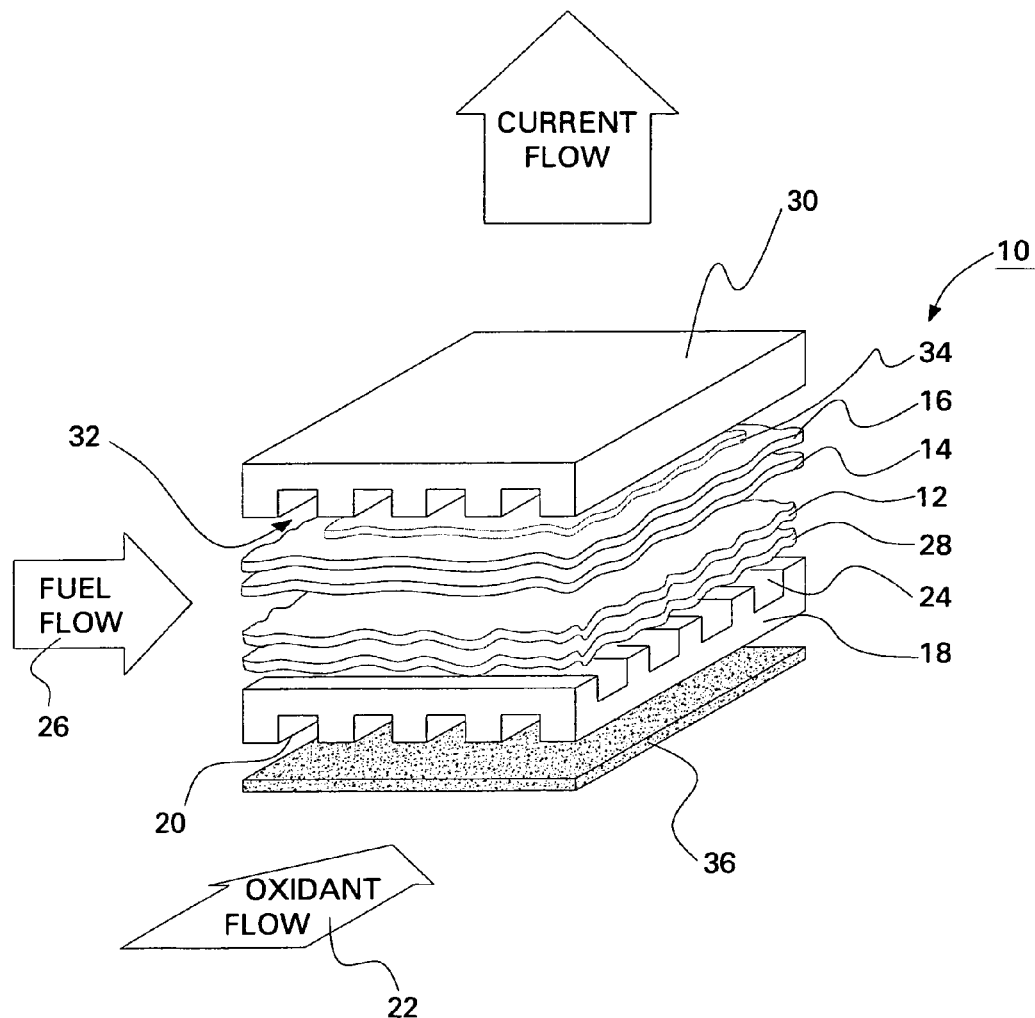
FIG. 1 is a perspective, exploded view of a solid oxide fuel cell for some embodiments of the present invention.

FIG. 1 is a perspective, exploded view of one type of SOFC, formed according to some embodiments of this invention. SOFC 10 includes an anode 12, an electrolyte 14, and a cathode 16. In general, this cell arrangement is well-known in the art, although the configuration as positioned in the figure may be modified, e.g., with the anode above the electrolyte, and the cathode below the electrolyte. (Those skilled in the art understand that fuel cells may operate horizontally, vertically, or in any orientation).

The anode/electrolyte/cathode unit is situated over interconnect 18, which is generally conventional in the art. The interconnect includes passages for the flow of fuel and oxidant. In this non-limiting illustration, passages (flow channels) 20 are arranged for oxidant flow 22, while passages (flow channels) 24 are arranged for fuel flow 26. In this exemplary design, the fuel flow passage and oxidant passages are orthogonal to each other, although they do not intersect. (It is usually desirable to separate fuel flow from oxidant flow, in order to ensure safe and efficient operation. Moreover, the fuel-oxidant channels need not be oriented orthogonally, and could instead be designed for co-, counter, or cross-flow, for example). Interconnect 18 would usually be formed from a metal which is not readily oxidized. Non-limiting examples include various stainless steel grades, as well as nickel alloys.

A porous support layer 28 is disposed over interconnect 18. Layer 28 provides support for the active anode 12, which is subsequently applied thereon. The use of this support structure helps to ensure that the subsequently-deposited anode layer is relatively smooth and level. Support layer 28 can also function as a stress-relieving material during the high temperature-operation of the SOFC, e.g., helping to better match the coefficient of thermal expansion (CTE) of anode layer 12 and interconnect 18.

Support layer 28 can be in many forms, and can be prepared by many techniques. For example, the support layer can be a porous foam or tape, e.g., a nickel-based tape. It can also be in the form of a woven wire structure, a knitted wire structure, or some type of fiber felt. Layer 28 could be laid over interconnect 18 as a pre-formed sheet, or it could be deposited over the interconnect, e.g., by plasma spray, wet-powder spraying, chemical vapor deposition (CVD), physical vapor deposition (PVD), and the like. In some preferred embodiments—especially when the surface area of the interconnect is relatively large—the support layer is a pre-formed foam structure. The structure may be set in place over interconnect 18, and fastened thereto by conventional techniques, e.g., brazing.

The thickness of support layer 28 will depend on various factors. They include the size of flow channels 20 and 24; and the thermal load placed on the support layer from a particular deposition technique. In some embodiments, the support layer has a thickness in the range of about 5 mils to about 65 mils (i.e., about 127 microns ($\mu m$) to about 1651 microns ($\mu m$)). However, thinner support layers are also possible. Moreover, support layer 28 can sometimes be integrated with interconnect 18.

The porosity of support layer 28 will also depend on various factors. Some of the factors are as follows: the composition of the anode/electrolyte/cathode layers; the power density requirements of the SOFC; the flow rate of the fuel; the size of the depositing powder; and the amount of heat generated by the plasma (when plasma spray techniques are used to deposit the various layers of the device). Usually, the support layer will have a porosity of at least about 30%, i.e., a 30% void volume, as measured by a conventional measuring technique such as mercury porosimetry. In some specific embodiments, the porosity is greater than about 40%, and sometimes greater than about 60%. The maximum amount of porosity is usually no greater than about 85%. In some preferred embodiments, the range of porosity for the support layer is in the range of about 65% to about 75%.

As mentioned previously, anode 12 is formed over support layer 28. For this invention, the material forming the anode comprises nickel/stabilized zirconia. Those skilled in the art are familiar with various forms of stabilized zirconia, e.g., zirconia stabilized with yttria, scandia, or ceria. The weight-ratio of nickel oxide to stabilized zirconia can vary significantly, and will depend in large part on the physical and electrochemical requirements of the anode. (In general, the weight ratio is determined with the ending nickel material in mind, i.e., nickel metal).

Usually, the weight ratio of nickel oxide to stabilized zirconia is in the range of about 20:80 to about 80:20. (For example, the ratio may be calculated to yield an ending material of about 50:50 nickel:stabilized zirconia.) In some specific embodiments, the weight ratio of nickel oxide to stabilized zirconia is in the range of about 35:65 to about 65:35.

The nickel oxide/stabilized zirconia powder is a spray-agglomerated material which has been prepared by a combustion spray pyrolysis (CSP) process. CSP processes are known in the art and described in various references. Non-limiting examples include U.S. Pat. No. 5,061,682 (Aksay et al) and U.S. Pat. No. 5,869,432 (Aksay et al), which are incorporated herein by reference. The process is also generally described in an article by Sangjin Lee et al: "Preparation of BaTiO$_3$ Nanopaticles by Combustion Spray Pyrolysis", Materials Letters 58 (2004), pp. 2932-2936, which is also incorporated herein by reference.

As described in U.S. Pat. No. 5,869,432, the first step of a CSP process typically involves a solution preparation of the materials which are to form the anode. The starting materials (e.g., nickel oxide precursors and zirconia precursors) are incorporated into a liquid mixture by conventional techniques, in proportions suitable for obtaining the desired powder composition. Each material (i.e., the stabilized zirconia and the nickel) is utilized in a form most suitable for stable solution formation. For example, the starting materials may be in the form of salts, or a wide variety of organic or inorganic complexes, e.g., citrates, acetates, carbonates, and the like. Those skilled in the art are familiar with a large variety of appropriate metallic and oxide salts, complexes, and the like.

The liquid vehicle for the solution can also comprise a wide variety of materials, e.g., a carbohydrate is typically included, along with various acidic species. The vehicle is often an aqueous based acidic solution. The liquid mixture can also include a variety of additives. Non-limiting examples include binders, dispersants; deflocculants, anti-settling agents, and surfactants. Moreover, the appropriate concentration of salts, complexes, etc., for nickel and zirconia can be determined without undue effort, as can the appropriate level of each solution additive.

The next primary step in the CSP process usually involves the spray pyrolysis itself. Here, the liquid solution which contains nickel oxide/stabilized zirconia precursors is spray-pyrolyzed in a suitable spray dryer. (Spray dryers and spray drying techniques are generally well-known in the art). Atomization of the solution can be carried out, for example, in a conventional air-driven rotary atomizer, with an appropriate solution feed rate. The atomized droplets of material can be rapidly dehydrated in a suitable chamber fed with heated dry air. In some embodiments, the dehydrated nickel oxide/stabilized zirconia granules that are formed are entrained in the hot air stream, and then dispersed in some type of separator, e.g., a cyclone separator.

The dispersed nickel oxide/stabilized zirconia powder can then be combusted by various techniques. For example, the powder can be routed to a furnace which operates at a temperature suitable to induce combustion of the powder granules. The appropriate furnace temperature will depend in part on the specific composition of the nickel oxide/stabilized zirconia material. It is usually in the range of about 700° C. to about 800° C., although this temperature range could vary significantly. Treatment by way of this exothermic step also promotes the initial reaction of the powder particles to form partially-reacted precursor powders, e.g., oxide phases and/or carbonate phases. The treatment also induces particle fragmentation into very fine granules (while maintaining micro-scale mixing). Those skilled in the art are familiar with other parameters for this step, e.g., atomizer air pressure.

The next primary step usually involves calcination. The precursor nickel oxide/stabilized zirconia powder is recovered from the spray dryer/furnace and then calcined in a suitable chamber, (e.g., a small box furnace). A variety of calcination techniques can be used in this step, as long as they are sufficient for removing volatile components from the powder, and fully reacting the precursor species to form the final powder particles. (Calcination also can serve to burn off any residual carbon, while also crystallizing the nickel oxide and stabilized zirconia). Calcination temperatures will generally be dependent on these objectives, and the specific composition being treated. They are usually in the range of about 900° C. to about 1100° C., although this temperature range can also vary significantly.

The calcined nickel oxide/stabilized zirconia powder can then be deagglomerated, e.g., milled or ground by any suitable technique. For example, a ball mill can be used with an appropriate milling media, such as various metal oxide materials. Those skilled in the art will be able to select the most appropriate milling time needed to obtain a substantially homogenous powder product. Usually, the powder particles at this stage have an average particle size in the range of about 0.5 micron to about 1.5 microns.

In some embodiments, the powder product is subjected to an additional spray-agglomeration step (sometimes referred to as "spray-granulation") after milling. Spray-agglomeration can be used to increase the size of the particles, for better thermal-spraying. Typically, spray-agglomeration is carried out in a slurry, with a binder present (e.g., polyvinyl alcohol), and concludes with spray-drying. However, variations on this technique are possible. In many preferred embodiments, the average particle size after spray-agglomeration is in the range of about 20 microns to about 50 microns.

Moreover, in some embodiments, the powder product can also be subjected to a sintering step at this stage, with or without the spray-agglomeration step. (Sintering can alternatively be undertaken during an earlier stage of the process). Sintering of the milled powder burns off the binder, and increases the green strength of the powder. Sintering can be carried out in an oxygen-containing atmosphere. The sintering temperature is usually in the range of about 900° C. to about 1100° C., although this temperature range can also vary. The most appropriate temperature will be adjusted to avoid clumping of the powder product, which could otherwise require another milling step. In general, this sintering step improves the flow and feeding properties of the powder product.

The nickel oxide/stabilized zirconia powder prepared by CSP can be characterized by various techniques, or a combination of techniques. Non-limiting examples include X-ray diffraction analysis, and scanning electron microscopy. The powder comprises agglomerated particles which contain a very fine, substantially homogenous dispersion of submicron granules of nickel oxide and stabilized zirconia. Usually, the agglomerated powder particles are substantially spherical. They typically have an average particle size in the range of about 3 microns to about 50 microns, and in some specific embodiments, in the range of about 20 microns to about 50 microns.

Moreover, in some specific embodiments, at least about 80% of the agglomerated powder particles have a particle size no greater than about 30 microns. The use of such a powder results in a thermal-sprayed surface which is believed to be smoother than plasma-sprayed anode surfaces of the prior art. The smoother surface does not require as thick an overlying electrolyte layer 14 (which would otherwise have to compensate for the peaks and valleys of a rougher surface). The decreased thickness for the electrolyte layer is especially advantageous for the performance of the device, because of the shorter conduction path for oxygen ions.

The submicron-scale granules within the agglomerated particles of nickel oxide/stabilized zirconia material usually have an average size in the range of about 20 nm to about 750 nm, but that range can sometimes vary significantly. In some specific embodiments, the average size is in the range of about 50 nm to about 200 nm. Moreover, in many embodiments, substantially all of the granules contain some portion of both nickel oxide and stabilized zirconia, due to preparation with a CSP technique.

With reference to FIG. 1, anode layer 12 is applied over support layer 28 by a thermal spray process. As used herein, a "thermal spray process" can refer to vacuum plasma spray (VPS), air plasma spray (APS), high velocity oxy-fuel (HVOF), Low Pressure Plasma Spray, and related techniques. These deposition techniques are generally well-known in the art, and are described for example, in U.S. Pat. No. 6,274,201 (Borom et al); U.S. Pat. No. 6,022,594 (Borom et al); U.S. Pat. No. 5,332,598 (Kawasaki et al); U.S. Pat. No. 5,047,612 (Savkar et al); and U.S. Pat. No. 4,741,286 (Itoh et al), all of which are incorporated herein by reference.

Plasma spray techniques usually involve the formation of a high-temperature plasma, which produces a thermal plume. The nickel oxide/stabilized zirconia powder particles melt in the plasma, and are accelerated to the substrate, i.e., support layer 28. When the process is carried out in a vacuum, it is referred to as VPS. When the process is carried out in air, it is referred to as APS. Those familiar with plasma spray coating techniques are aware of various details which are relevant to applying the material. Examples of the various steps and process parameters include: cleaning of the underlying surface prior to deposition, and adjustment of substrate temperature. Specific plasma spray parameters include spray distances (gun-to-substrate); gun type; gun speed across the substrate surface; selection of the number of spray-passes; powder feed rate, torch power, plasma gas selection; secondary gas selection; carrier gas selection; current, power level, pressure, oxidation control to adjust material stoichiometry; angle-of-deposition; post-treatment of the applied layer; and the presence and type of surface pre-treatment steps (like those described above).

For a typical VPS system, some non-limiting, exemplary operating parameters can be provided, for the deposition of the anode with the nickel oxide/stabilized zirconia material. The as-sprayed thickness for this illustration is about 2 microns to about 50 microns (and preferably about 5 microns to about 20 microns. A conventional vacuum plasma spray gun can be used, e.g., an O3C gun from Sulzer-Metco, having a V118T19 nozzle from Plasma Processes, Inc., or one having a 03CA110 nozzle from Sulzer-Metco, with a 03CA9 cathode.

The illustrative parameters are as follows:
  Surface speed of deposition gun: about 1000 to about 2000 mm/s.
  Thickness per deposition pass: about 0.05 to about 0.3 micron per pass.
  Spray distance: about 17.8 cm to about 27.9 cm (7-11 inches)
  Primary gas feed rate (argon): about 150 cfh to about 260 cfh.
  Secondary gas feed rate (helium): about 0 cfh to about 150 cfh.
  Substrate temperature: about 500° C. to about 900° C.
  Carrier gas flow: about 20 cfh to about 60 cfh.
  Pressure: about 40 Torr to about 200 Torr
  Current: about 1200 amp to about 1900 amp
  Power: about 50 kW to about 120 kW
  Powder feed rate: about 5 g/min to about 20 g/min Many variables are possible in such a process. For example, primary gasses other than argon could be employed, such as nitrogen. Secondary gasses other than helium could be used, such as hydrogen. Various carrier gasses could be used as well, such as nitrogen or argon. (Those of ordinary skill in the art are familiar with the various factors which relate to the selection of a gas, e.g., deposition material; the ionization energy of the gas; cost factors, and equipment requirements).

Moreover, the various spray- and equipment conditions usually must be adapted to provide a relatively smooth surface for anode 12, since the smoothness characteristic is directly related to the upper limit on powder size. For example, an anode surface having a surface roughness $R_a$ (as deposited) of less than about 3 microns is often desirable. Furthermore, the plasma power must be monitored, to achieve the most appropriate porosity for the anode layer. In general, if the power level is too high, the resulting layer will be too dense; and if the power level is too low, the resulting layer will be too porous. (An anode layer which is too porous can result in poor electrical conductivity for the fuel cell. Moreover, deposition of the electrolytic layer can damage an excessively-porous anode layer).

For a typical APS system, those skilled in the art are familiar with the various operating parameters used to deposit materials like those described herein. The general parameters and other factors were listed up above, in reference to VPS deposition. Various patents referenced herein, such as U.S. Pat. No. 6,274,201 (Borom et al), are also instructive, as are other available sources of information. Moreover, adjustments in those operating parameters can be made without undue experimentation, to ensure the formation of a nickel/stabilized zirconia anode with the characteristics specified herein, e.g., in regard to porosity level, microstructure, and the like.

HVOF techniques which may be used to form the anode layer are also known in the art and described, for example, in U.S. Pat. Nos. 5,508,097 and 5,527,591, both incorporated herein by reference. HVOF is a continuous combustion process in which the powder is injected into the jet stream of a spray gun at very high speeds, e.g., at least about 500 meters per second. Those skilled in the art will be able to determine the most appropriate conditions for conventional HVOF systems.

The anode layer can be heat treated after it is formed, under conditions sufficient to reduce substantially all of the nickel oxide to nickel metal. In general, the heat treatment can vary considerably, in terms of temperature, duration and environment. As a non-limiting illustration, the heat treatment can be carried out in hydrogen at a temperature of about 800° C., for about 3 hours. As mentioned below, the flow of hydrogen through the completed SOFC device, in an operational or pre-operational mode, is itself an adequate heat-treatment, i.e., to reduce the nickel oxide.

The thickness of anode layer 12 can vary considerably, and is usually in the range of about 5 microns to about 100 microns. In some preferred embodiments, the anode layer has a thickness of no greater than about 20 microns. Moreover, in some specific embodiments, anode layer 12 has a porosity of at least about 10%, and preferably, at least about 25%. Usually, the maximum porosity for the anode layer is about 50%.

As described below, the thermally-sprayed (e.g., by VPS) nickel/stabilized zirconia material for anode layer 12 comprises extremely well-dispersed powder particles. In preferred embodiments, the particles (after spraying) have a diameter of less than about 300 nm. In especially preferred embodiments, the particles have an average diameter of less than about 200 nm.

Moreover, the active anode can be further characterized by a tri-phase length value, as a proportion of volume. The tri-phase length value can be calculated, using well-known statistical models. The value is defined herein as the length of the tri-phase boundary between the Ni/stabilized zirconia particles and the surrounding porous region, per unit volume. A relevant discussion of this general type of modeling technique is found in "Micro-Modelling of Solid Oxide Fuel Cell Electrodes", by Paola Costamagna et al, Electrochimica Acta., Vol. 43, Nos. 3-4, pp. 375-394 (1998), the contents of which are incorporated herein by reference. As an example, Equation No. 22 (page 383) of the reference can be used to calculate a tri-phase area for particles which contact each other. As those of ordinary skill in modeling and statistics understand, the tri-phase area can be converted to tri-phase length by a scaling factor. For example, if the spherical particles are viewed as circles in two dimensions, the scaling factor could be calculated as the ratio of the perimeter of the contacting circles, to their area. In preferred embodiments, the tri-phase length should be greater than about 50 $\mu m/\mu m^3$ (as measured after reduction of the nickel oxide to nickel metal in the anode). In some especially preferred embodiments the tri-phase length should be greater than about 100 $\mu m/\mu m^3$.

The tri-phase length values within these ranges are consistent with a very fine dispersion of particles. In marked contrast, anode structures formed from prior art processes do not exhibit this type of fine microstructure. For example, a conventional anode structure formed from a plasma-sprayed NiO/stabilized zirconia powder with an average particle diameter of greater than about 2,000 nm would exhibit a tri-phase length of less than about 1 $\mu m/\mu m^3$. Moreover, an anode structure formed by a conventional, sintering-type process (as described above), with an average particle diameter of greater than about 400 nm, would exhibit a tri-phase length of less than about 25 $\mu m/\mu m^3$.

In some embodiments, the composition of the anode layer can be graded, through its depth. For example, it may be desirable to incorporate a larger proportion of stabilized zirconia in the region of the anode which is closest to the adjacent electrolyte layer. In similar fashion, it may be desirable to incorporate a larger proportion of nickel in the region of the anode which is closest to the underlying metallic support layer. Thus, the grading pattern can be selected for a variety of properties, e.g., electrical/ionic conduction characteristics, thermal expansion matching, and the like. The grading technique can be readily carried out with any thermal spray process, e.g., by varying the feed composition entering the gun nozzle, and adjusting any related parameters.

With continued reference to FIG. 1, electrolyte layer 14 is applied over anode layer 12. A variety of processes may be used to apply layer 14, although thermal spray processes are preferred. In many embodiments, electrolyte layer 14 is applied by the same process used to form the anode layer, e.g., APS or VPS. For example, the particular plasma spray process could be carried out in a substantially continuous manner, by varying process conditions and the powder feed material when it is time to form layer 14.

A variety of materials may be used to form electrolyte layer 14. Most are ionic oxides which are well-known in the field of SOFC devices. In many embodiments, the electrolyte layer is formed of a material which comprises a zirconia-based material. Zirconia-based materials like YSZ, ceria-doped zirconia, or scandia-doped zirconia can be especially suitable because they exhibit substantially pure anionic conductivity over a wide range of $O_2$ partial pressure levels. Non-limiting examples of other possible materials include samarium-doped $CeO_2$, gadolinium-doped cerium oxide, and strontium-magnesium-doped lanthanum gallate (LSGM). (Other types of LSGM materials are also possible, e.g., those doped with iron, cobalt, and the like).

Those skilled in the art are familiar with the basic requirements for the electrolyte. For example, electrolyte layer 14 should be as dense as possible. In other words, the layer should be substantially free of porosity which would otherwise allow gases to permeate from one side of the layer to the other.

Furthermore, the electrolyte should be as thin as possible, to minimize ohmic loss. In preferred embodiments, electrolyte layer 14 has a thickness less than about 50 microns, and preferably, less than about 10 microns. As further discussed herein, the use of the spray-agglomerated, nickel oxide/stabilized zirconia powder in the underlying anode layer 12 permits the use of a relatively thin electrolyte layer 14, which has important performance advantages.

As also depicted in FIG. 1, cathode layer 16 is applied over electrolyte layer 14. As in the case of the electrolyte, a variety of processes may be used to apply layer 16, e.g., screen-printing, followed by sintering, preferably at a relatively low temperature. Thermal spray processes are often preferred. Moreover, the cathode layer can be formed in a substantially continuous manner with the electrolyte and the anode, by changing the process conditions and the powder feed material at the appropriate time.

Various materials can be used to form the cathode 16. They are generally known in the art, and are often mixed ion conductors. Non-limiting examples include stabilized zirconia impregnated with praseodymium oxide; stabilized zirconia impregnated with strontium-doped lanthanum manganate (LSM); strontium-doped lanthanum ferrite (LSF); strontium-doped scandium cobaltite (SSC); and La—Sr—Co—Fe—O-based materials (e.g., LSCF), along with various mixtures of any of these materials. Specific compounds are described in various references, such as U.S. Pat. No. 6,794,075 (Steele et al), which is incorporated herein by reference.

The thickness of the cathode can vary considerably, and is usually in the range of about 3 microns to about 100 microns. In some preferred embodiments, the cathode has a thickness no greater than about 40 microns. Moreover, the porosity of the cathode will depend in large part on the type of cathode used. Usually, the porosity is in the range of about 20% to about 60%, although. However, this range can vary as well.

As shown in FIG. 1, an upper interconnect 30 is situated over the top of the SOFC device. Interconnect 30 is a conventional element of such a device, and can be constructed in a variety of designs, and with a variety of materials. The interconnect is usually formed of a metal which exhibits good conductivity, such as various types of stainless steel. The interconnect should also provide optimized contact-area with the cathode, along with low inter-face-resistance with the cathode.

The most appropriate design for interconnect 30 will generally depend on its intended function. For example, the upper interconnect may simply serve as an end plate which can accommodate fuel and oxidant flow, so as to complete the electrical circuit of the SOFC. Alternatively (or in addition to that function), interconnect 30 may function as the electrical connection between cathode 16 and the anode of an adjacent cell above the cathode (not shown). (The assembly of individual cells to form a fuel cell stack is known in the art and briefly discussed below). Interconnect 30 includes one or more sets of passageways 32, depicted very generally in FIG. 1. The passages usually accommodate the flow of oxidant and/or fuel, in a manner which may be similar to the function of interconnect 18.

Moreover, interconnect 30 of FIG. 1 may be attached to the rest of the device by various techniques, e.g., pressing. In some instances, a film or layer 34 of bond paste may be used between cathode 16 and interconnect 30. Layer 34 can function to enhance electrical conductivity between the cathode and the interconnect. An optional lower cathode layer 36 is also depicted in FIG. 1. Cathode layer 36 generally represents the upper portion of another SOFC (not shown), which would be attached below SOFC 10, to form a fuel cell stack.

As mentioned above, another embodiment of the invention is directed to a solid oxide fuel cell stack, made from a number of individual fuel cell units. Each fuel cell would include an anode, cathode, and an electrolyte. As those skilled in the art understand, each fuel cell is usually sandwiched between interconnects. In turn, the interconnects collect current, connect the cells in series, and usually (but not always) incorporate flow fields as part of their design function. Thus, in terms of function, the interconnect structures typically provide an electrical circuit path through the entire fuel cell stack. According to embodiments of this invention, at least one of the anodes (and preferably all of them) will comprise finely-dispersed nickel/stabilized-zirconia powder particles, as described herein.

EXAMPLES

The following examples are merely illustrative, and should not be construed to be any sort of limitation on the scope of the claimed invention. All parts and percentages are expressed in terms of weight, unless otherwise specified.

Example 1

Figure 2:
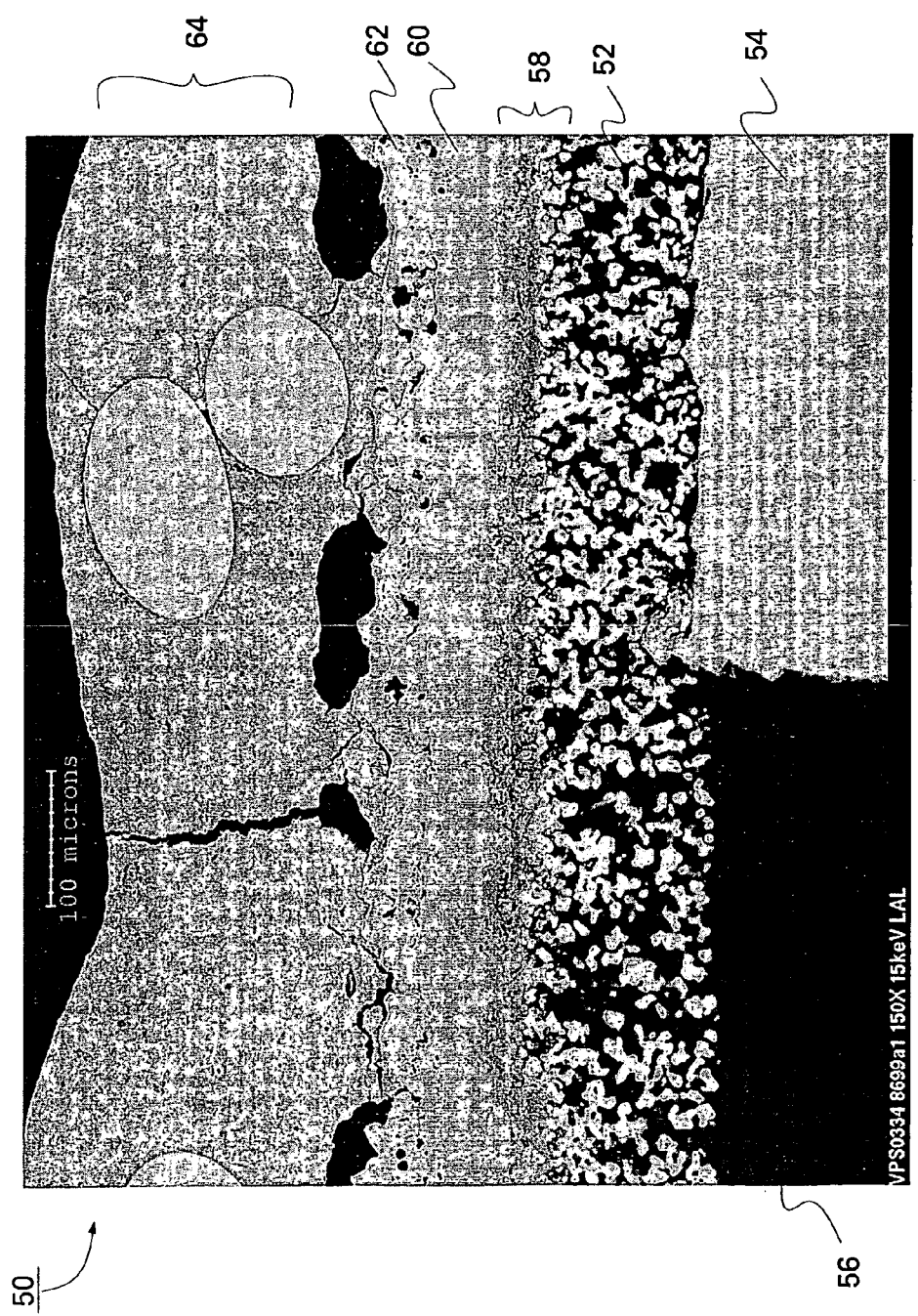
FIG. 2 is a scanning electron microscope image of the cross-section of a portion of a solid oxide fuel cell, according to some inventive embodiments.

An SOFC was prepared according to some embodiments of the present invention. FIG. 2 is a scanning electron microscope (SEM) image of the cross-section of a portion of the SOFC 50. In this example, a layer 52 of nickel tape was used as the support layer. The tape had a thickness of about 150 microns, and a porosity of about 70%. The support layer 52 was fastened to substrate 54 by solid state diffusion bonding. The substrate was formed of an E-Brite® stainless steel material. The substrate had a thickness of about 65 mils (1.65 mm). Substrate 54 served as the interconnect, and included a pattern of fuel/oxidant passageways, such as passageway 56.

The material forming anode layer 58 was a nickel oxide/stabilized zirconia powder prepared by a combustion spray pyrolysis (CSP) technique, as described previously. The material was obtained from Praxair Specialty Ceramics, Woodinville, Wash. As used, the powder contained 60% by weight NiO and 40% by weight YSZ, at 99.9% purity. The average particle size was about 40 microns. The powder particles contained submicron-scale granules of NiO and YSZ, with an average granule size of about 50 nm to about 200 nm.

The electrolyte layer 60 was formed from a standard YSZ material, obtained from Medicoat AG, and having an average particle size of about 15 microns. The cathode layer 62 was formed from a commercial, strontium-doped lanthanum ferrite (LSF) material, obtained from Praxair, Inc., and having an average particle size of about 25 microns. A layer 64 of the LSF material was painted by hand over cathode 62, serving as the bond paste.

The following spray conditions were employed, using the VPS system listed above. (VPS was carried out in a "rotating-translating mode". In this type of apparatus, the substrate translates (at about 5 cm/s) through the plasma beam, which is fixed, while rotating rapidly.

TABLE 1

|  | Anode Layer | Electrolyte Layer | Cathode Layer |
| --- | --- | --- | --- |
| Material: | NiO/YSZ | YSZ | LSF |
| Rotation Speed: | 130 rpm | 160 rpm | 130 rpm |
|  | (~1200 mm/s) | (~1600 mm/s) | (~1200 mm/s) |
| Thickness per pass: | (For each layer: between about 0.05 and 0.2 micron per pass) | | |
| Distance*: | (For each layer: about 9 inches (22.9 cm) | | |
| Primary gas (argon) | | | |
| Flow rate | (For each layer: about 230 cfh) | | |
| Secondary gas (helium) | | | |
| Flow rate | 50 cfh | 150 cfh | 50 cfh |
| Substrate Temp.** | 700° C. | 900° C. | 500° C. |
| Carrier gas (argon) | | | |
| Flow rate | (For each layer: about 47 cfh) | | |
| Pressure | (For each layer: about 75 torr) | | |
| Current | 1600 amp | 1900 amp | 1100 amp |
| Power | 70 kW | 100 kW | 50 kW |
| Powder feed rate | 10 g/min | 12 g/min | 14 g/min |

*gun distance from substrate
**Substrate temperature obtained by using a second plasma, without powder, directed at the substrate.

As mentioned above, FIG. 2 is an image of a cross-section of the SOFC device prepared in this example. In a testoperational mode, the device had been heat-treated at 800° C., for 100 hours. The heat treatment was sufficient to reduce substantially all of the nickel oxide in the anode layer, to nickel metal. The scale provided in FIG. 2 provides an adequate measurement for the average thickness of the bond paste layer, as well as the cathode/electrolyte/anode structure, and the underlying nickel tape 52. As shown in figure, anode 58 and cathode 62 were substantially porous, while electrolyte 60 was very dense.

Figure 3:
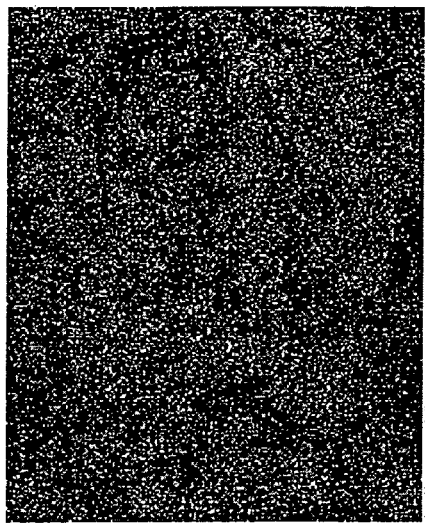
FIG. 3 is a spectroscopic elemental map of zirconium for a plasma-sprayed nickel/zirconia-based powder material.
Figure 4:
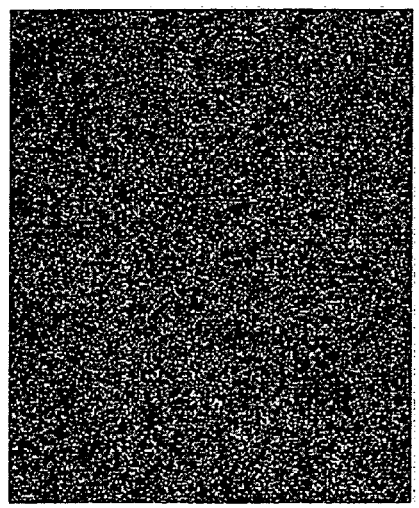
FIG. 4 is a spectroscopic elemental map of nickel for a plasma-sprayed nickel/zirconia-based powder material.

FIG. 3 is an EDS (electron diffraction spectroscopy) elemental map of zirconium for a VPS-sprayed zirconia-based powder material. The powder was prepared by the CSP process, and the material was subsequently heat-treated at about 800° C. for about 3 hours. FIG. 4 is an EDS elemental map of nickel, for the same sample. It is apparent from each of these figures that the particles which are visible (zirconia particles and nickel particles in FIGS. 3 and 4, respectively) are extremely well-dispersed.

Figure 5:
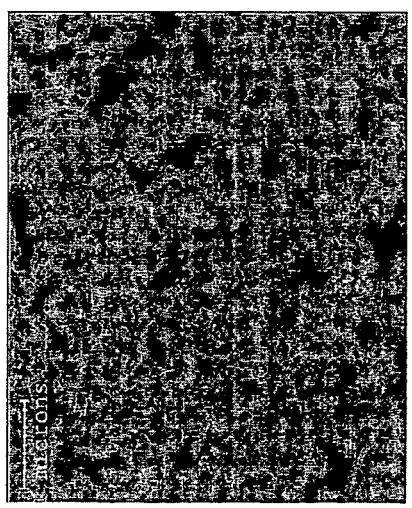
FIG. 5 is a scanning electron microscope image of a portion of the sample depicted in FIGS. 3 and 4.

FIG. 5 is a scanning electron microscope (SEM) photomicrograph of a portion of the sample region depicted in FIGS. 3 and 4. The figure shows a very fine, substantially homogenous dispersion of nickel and YSZ particles, along with some denser regions of a surrounding matrix material (larger yttria-stabilized zirconia particles, or mixtures of such particles with nickel particles).

Moreover, the porosity level of the sample of FIG. 5 resulted in a very large number of triple phase boundary sites. As discussed previously, this microstructure is extremely advantageous for the electrical characteristics of an active anode layer. (During the initial operation of an SOFC like that described here, hydrogen flowing through the fuel passageways can further reduce the nickel oxide, thereby increasing the porosity level within the anode). The presence of the YSZ particles in the anode layer is also advantageous because they substantially prevent agglomeration of the nickel metal in the layer during exposure to very high temperatures. Thus, the desirable number of triple phase boundary sites can be maintained over an extended period of time.

Example 2

A series of VPS-sprayed samples based on the spray-agglomerated nickel oxide/stabilized zirconia material were prepared for the active anode of an SOFC. For each sample, one or more plasma spray conditions were changed, and the effect on the characteristics of the anode material was evaluated. The base-line spray conditions were as follows:

TABLE 2

| Material: | NiO/YSZ |
|---|---|
| Rotation Speed: | 130 rpm |
| Thickness per pass: | between about 0.05 and 0.2 microns per pass) |
| Distance*: | about 9 inches (22.9 cm) |
| Primary gas (argon) | |
| Flow rate | about 230 cfh |
| Secondary gas (helium) | |
| Flow rate | 50 cfh |
| Substrate Temp. | 700° C. |
| Carrier gas (argon) | |
| Flow rate | 47 cfh |
| Pressure | 75 torr |
| Current | 1600 amp |
| Power | 70 kW |
| Powder feed rate | 10 g/min |

*gun distance from substrate

Figure 6:
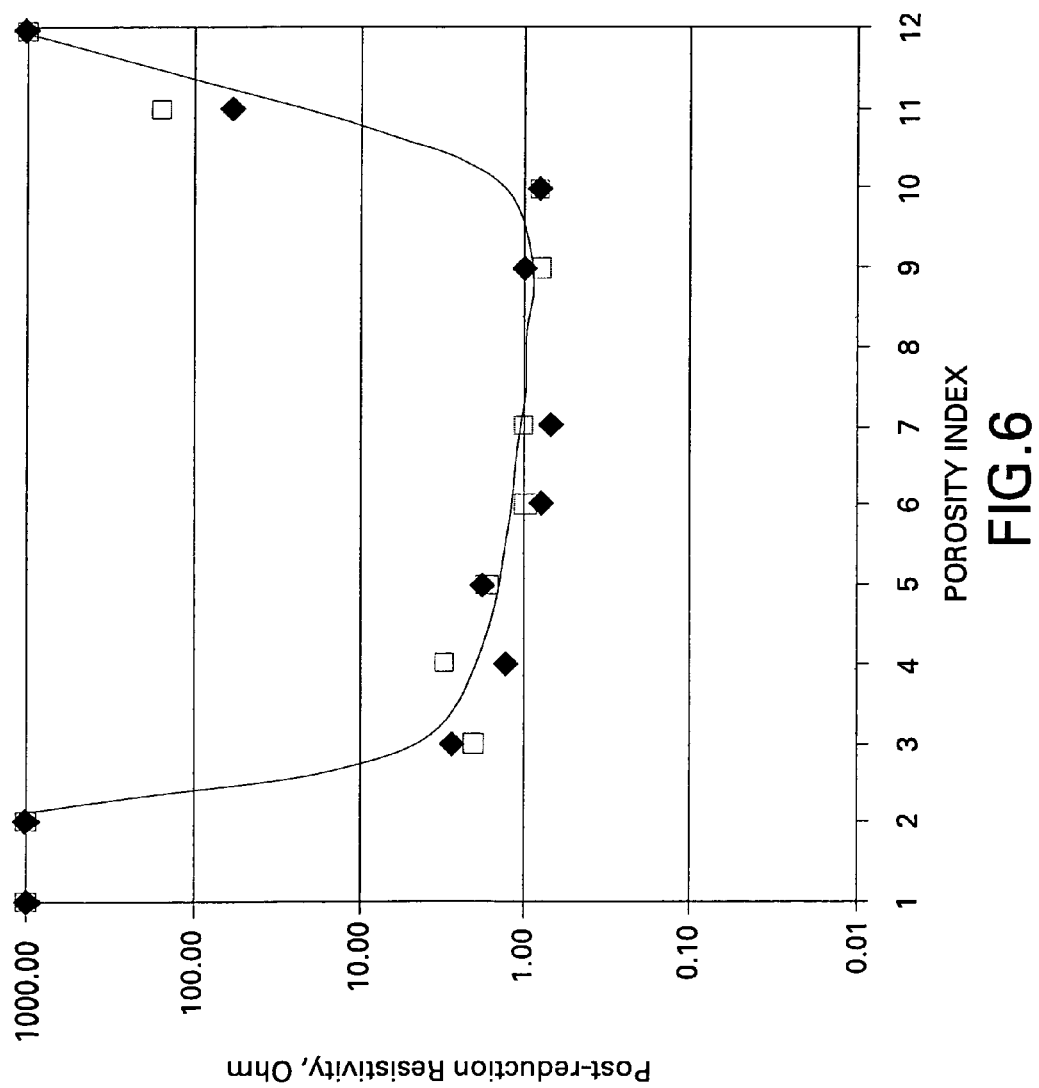
FIG. 6 is a graph depicting electrical characteristics as a function of porosity index values for a plasma-sprayed sample based on spray-agglomerated, nickel oxide/stabilized zirconia powder.

FIG. 6 is a graph in which the electrical characteristics are measured as a function of a porosity index value for the samples. (The degree of porosity for the porosity index was measured visually for each sample, and verified with SEM images for most samples). Increasing values along the horizontal axis (X-axis) indicate increasing porosity. In the figure, the black diamond data points represent through-coating resistivity, while the white squares represent in-plane resistivity. For the indicated samples, the primary conditions which were varied were: (1) helium flow, which determines heat transfer characteristics and "drag" characteristics; and (2) electrical current. (Increases in the applied current usually result in denser films; and increases in helium flow usually have the same type of effect).

An evaluation of the various samples demonstrated the most ideal conditions for the deposition of the anode material. In this particular instance, samples which exhibited a porosity index of less than about 4 had a microstructure which may be too dense for some of the SOFC devices. On the other end of the horizontal axis (X-axis), samples which exhibited a porosity index of greater than about 11 are usually too porous for the anode layer. Samples with a porosity index in the range of about 4 to about 11 appeared to exhibit the most appropriate porosity characteristics.

The data used for FIG. 6 represent conditions for one exemplary embodiment of the invention, and serve as a guideline for the practitioner. However, those skilled in the art understand that one can make many changes in material composition, spray conditions, and the like, which will provide different sets of parameters for other anode materials.

Moreover, it will be apparent to those of ordinary skill in this area of technology that other modifications of this invention (beyond those specifically described herein) may be made, without departing from the spirit of the invention. As an example, a wide variety of different types of solid oxide fuel cells are within the scope of this invention, as long as each device includes a porous anode which comprises the finely-dispersed nickel/stabilized zirconia powder particles, as described above.

Accordingly, the modifications contemplated by those skilled in the art should be considered to be within the scope of this invention. Furthermore, all of the patents, patent articles, and other references mentioned above are incorporated herein by reference.

What is claimed is:

1. A solid oxide fuel cell, comprising:
   (I) a porous anode, comprising a layer of finely-dispersed nickel oxide/stabilized-zirconia powder particles, wherein the particles have an average diameter of less than 200 nanometers; and wherein the layer of particles is further characterized by a tri-phase length of greater than 50 μm/μm$^3$;
   (II) a porous cathode, spaced from the anode;
   (III) an electrolyte, disposed between the anode and the cathode; and
   (IV) at least one interconnect structure, attached to at least one of elements (I) or (II), and capable of accommodating the flow of fuel and/or oxidant through the fuel cell.

2. The solid oxide fuel cell of claim 1, wherein the anode has a porosity of at least 10%.

3. The solid oxide fuel cell of claim 2, wherein the anode has a porosity of at least 25%.

4. The solid oxide fuel cell of claim 1, wherein the weight ratio of nickel oxide to stabilized zirconia is in the range of 20:80 to 80:20.

5. The solid oxide fuel cell of claim 1, further comprising a porous support layer on which the anode is disposed.

6. The solid oxide fuel cell of claim 1, wherein the porous cathode of component (II) comprises a material selected from the group consisting of stabilized zirconia impregnated with praseodymium oxide; stabilized zirconia impregnated with strontium-doped lanthanum; manganate (LSM); strontium-doped lanthanum ferrite (LSF); strontium-doped scandium cobaltite (SSC); La—Sr—Co—Fe—O-based materials, and combinations thereof; and the electrolyte of component (III) comprises a material selected from the group consisting of stabilized zirconia; scandia-doped cerium oxide, gadolinium-doped cerium oxide, strontium-magnesium-doped lanthanum gallate (LSGM), and combinations thereof.

7. The solid oxide fuel cell of claim 1, wherein the electrolyte has a thickness which is less than 50 microns.

8. A solid oxide fuel cell, comprising a cathode-electrolyte-anode unit and at least one interconnect structure, wherein the anode comprises a layer of finely-dispersed nickel oxide/stabilized-zirconia powder particles which have an average diameter of less than 200 nanometers; and wherein the layer of particles is further characterized by a tri-phase length of greater than 50 $\mu m/\mu m^3$.

9. A solid oxide fuel cell stack, comprising
a) a plurality of fuel cell units, each including an anode, a cathode, and an electrolyte which separates the anode and the cathode; and
b) at least one interconnect structure situated between each fuel cell unit; capable of accommodating the flow of fuel and/or oxidant through adjacent fuel cell units, and capable of completing an electrical circuit through the fuel cell stack;
wherein the anode in each fuel cell unit comprises a layer of finely-dispersed nickel oxide/stabilized-zirconia powder particles which have an average diameter of less than 200 nanometers; and wherein the layer of particles is further characterized by a tri-phase length of greater than about 50 $\mu m/\mu m^3$.

10. A porous anode for a fuel cell, comprising a layer of finely dispersed nickel/stabilized-zirconia powder particles, wherein the particles have an average diameter of less than 200 nanometers; and wherein the layer of particles is further characterized by a tri-phase length of greater than 50 $\mu m/\mu m^3$.

11. The solid oxide fuel cell of claim 1, wherein the nickel oxide/stabilized-zirconia particles are spray-agglomerated.

12. The solid oxide fuel cell of claim 11, wherein the spray-agglomerated particles are prepared by a combustion spray pyrolysis technique.

13. The solid oxide fuel cell of claim 1, wherein the weight ratio of nickel oxide to stabilized zirconia is 60:40.

* * * * *